United States Patent
Lin et al.

(10) Patent No.: US 9,970,789 B2
(45) Date of Patent: May 15, 2018

(54) AUTOMATIC ANGLE-MEASURED APPARATUS AND METHOD USING THE SAME

(71) Applicant: Industrial Technology Research Institute, Hsin-Chu (TW)

(72) Inventors: Chia-Ching Lin, Taichung (TW); Chin-Hui Chen, Taichung County (TW); Shu-Yu Lin, Chiayi County (TW); Ming-Chun Ho, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 197 days.

(21) Appl. No.: 14/968,165

(22) Filed: Dec. 14, 2015

(65) Prior Publication Data

US 2017/0115137 A1    Apr. 27, 2017

(30) Foreign Application Priority Data

Oct. 23, 2015  (TW) .............................. 104134943 A

(51) Int. Cl.
   *G01D 5/26*   (2006.01)
   *B60N 2/00*   (2006.01)
   *G05B 19/00*  (2006.01)

(52) U.S. Cl.
   CPC ............... *G01D 5/26* (2013.01); *B60N 2/00* (2013.01); *G05B 19/00* (2013.01)

(58) Field of Classification Search
   CPC ............ G01D 5/26; G05B 19/00; B60N 2/00
   See application file for complete search history.

(56) References Cited

U.S. PATENT DOCUMENTS

| 4,783,998 A | 11/1988 | Sander |
| 5,200,797 A | 4/1993 | Tank et al. |

(Continued)

FOREIGN PATENT DOCUMENTS

| CA | 2007845 A1 | 12/1990 |
| CN | 203069171 | 7/2013 |

(Continued)

OTHER PUBLICATIONS

Taiwan Intellectual Property Office, "Office Action", dated Apr. 19, 2017.

(Continued)

*Primary Examiner* — Tony Ko
(74) *Attorney, Agent, or Firm* — WPAT, PC

(57) ABSTRACT

An automatic angle-measured apparatus includes a driving unit coupled with a clamping plate and a driving seat, an encoding unit located at an end of the driving unit facing the driving seat and signally connected to the driving unit, at least one attitude sensor located at the driving seat, and a control unit signally connected to the encoding unit and the attitude sensor. The attitude sensor senses the un-rotated and the rotated driving seat to generate a first and a second signals, respectively. The control unit bases on the first and the second signals to calculate an offset. The control unit controls the driving unit to rotate a predetermined angle. The encoding unit bases on the predetermined angle to generate location information. The control unit bases on the first signal, the second signal and the location information to calculate angle information and compensation for performing a correction procedure.

17 Claims, 5 Drawing Sheets

(56) References Cited

U.S. PATENT DOCUMENTS

| | | | |
|---|---|---|---|
| 6,304,825 B1 | 10/2001 | Nowak et al. | |
| 6,326,781 B1 * | 12/2001 | Kunde | G01D 5/145 |
| | | | 324/144 |
| 6,418,629 B1 | 7/2002 | Oh | |
| 7,633,256 B2 * | 12/2009 | Reichert | G02B 26/122 |
| | | | 318/602 |
| 8,657,886 B2 | 2/2014 | Arinbj et al. | |
| RE45,565 E | 6/2015 | Bridges et al. | |
| 9,059,650 B2 | 6/2015 | Huang et al. | |

FOREIGN PATENT DOCUMENTS

| | | |
|---|---|---|
| EP | 0629927 A2 | 12/1994 |
| TW | 392066 | 6/2000 |
| TW | M435325 | 8/2012 |
| TW | I414751 | 11/2013 |
| TW | I445926 | 7/2014 |
| TW | 201504598 A | 2/2015 |
| TW | I493156 | 7/2015 |

OTHER PUBLICATIONS

Jun Wang et al. "A New High-Speed Algorithm for Center and Rotate Angle of Electronic Components," in Mechatronics and Automation, Proceedings of the 2006 IEEE International Conference on, pp. 228-232, Jun. 25-28, 2006, doi: 10.1109/ICMA.2006.257501.

Jeong-Whan Lee et al. "A Simple Optical Angular Sensors to Measure the Human Joint Angle," in SICE-ICASE, 2006. International Joint Conference , vol., No., pp. 1125-1126, Oct. 18-21, 2006 doi: 10.1109/SICE.2006.315285.

Xiujun Li et al. "An accurate low-cost capacitive absolute angular-position sensor with a full-circle range," IEEE Transactions on Instrumentation and Measurement (Impact Factor: 1.79). Apr. 1996; vol. 45 No. 2, pp. 516-520. DOI: 10.1109/19.492778.

Xin Fu et al. "Application of non-planar four-mode differential ring laser gyroscope in high-performance dynamic angle measurement," in Inertial Sensors and Systems Symposium (ISS), 2014 DGON , vol., No., pp. 1-10, Sep. 16-17, 2014 doi: 10.1109/InertialSensors.2014.7049474.

Gail A. Massey et al. "Fresnel drag technique for determining the spin-axis orientation of a spherical rotor," in Quantum Electronics, IEEE Journal of , vol. 6, No. 8, pp. 500-506, Aug. 1970 doi: 10.1109/JQE.1970.1076515.

Wataru Kokuyama et al., "Measurement of angle error of gyroscopes using a rotary table enhanced by self-calibratable rotary encoder," in Inertial Sensors and Systems (ISISS), 2015 IEEE International Symposium on , vol., No., pp. 1-4, Mar. 23-26, 2015 doi: 10.1109/ISISS.2015.7102363.

Taiwan Intellectual Property Office, "Office Action", dated Dec. 13, 2016.

\* cited by examiner

AUTOMATIC ANGLE-MEASURED APPARATUS AND METHOD USING THE SAME

CROSS REFERENCE TO RELATED APPLICATION

The present application is based on, and claims priority from, Taiwan (International) Application Serial Number 104134943, filed on Oct. 23, 2015, the disclosure of which is hereby incorporated by reference herein in its entirety.

TECHNICAL FIELD

The present disclosure relates to an automatic angle-measured apparatus and method using the same, and more particularly to the apparatus and the accompanying method that can implement synchronized rotations and attitude-change measurements so as to formulate necessary angular compensation for an object to be tested.

BACKGROUND

In industrial manufacturing, precision of machining equipment is critical to the quality of products. Hence, measurements, particularly real-time measurements, upon the machining equipment are especially crucial.

Currently, a typical tool for precisely measuring a rotational shaft of a machine, such as a lathe, includes a laser device, an angular splitter, an indexer, a controller and a computer. Generally, the indexer is mounted to the rotational shaft to be tested, the laser device is to emit a laser beam, and the laser beam is then led to penetrate the angular splitter so as to be received by the indexer rotated with the rotational shaft.

Then, the indexer transfers signals of the received laser beam to the computer via the controller. The emitted laser beam going through the indexer and the angular splitter finally backs to the laser device. After the laser device receives the coming-back laser beam, a signal is generated at the laser device and is further forwarded to the computer. The computer bases on these two signals to determine the location and readings of the indexer and further to realize the instant state of the rotational shaft, and also thereby relevant compensation or correction for the machine can be made.

Nevertheless, while in testing, adverse factors related to the surrounding, mounting, software, rotation speeds and/or timing usually affect the testing and may even terribly lead to a test fail or an unexpected delay.

Therefore, topics in improving the testing success and in increasing the testing efficiency are definitely welcome and worthy to the art.

SUMMARY

In this disclosure, an automatic angle-measured apparatus includes:
a clamping plate;
a driving seat;
a driving unit, coupled with the clamping plate and the driving seat;
an encoding unit, located at an end of the driving unit facing the driving seat, signally connected to the driving unit;
at least one attitude sensor, located at the driving seat; and
a control unit, signally connected to the encoding unit and the attitude sensor;
wherein the attitude sensor senses the driving seat in an un-rotation state to generate a first signal, the attitude sensor senses the driving seat after a rotation by a predetermined angle to generate a second signal, the control unit bases on the first signal and the second signal to calculate an offset, the control unit controls the driving unit to rotate a predetermined angle, the encoding unit bases on the predetermined angle of the driving unit to generate location information, the control unit bases on the first signal, the second signal and the location information to calculate angle information and compensation, and a correction procedure is then performed according to the compensation.

In this disclosure, an automatic angle-measured method comprises the steps of:

Step S1: configuring an initial state, at least one attitude sensor detecting a driving seat in an un-rotation state so as to generate a first signal, a control unit receiving the first signal so as to calculate initial-state information including a first instant attitude;

Step S2: providing a signal, the driving seat being rotated to a predetermined angle, then the attitude sensor detecting the driving seat so as to generate a second signal, the second signal being transmitted to the control unit;

Step S3: calculating a second instant attitude, the control unit basing on the second signal to calculate rotation-state information including a second instant attitude;

Step S4: calculating an offset and a control signal, the control unit basing on the initial-state information and the rotation-state information to calculate an offset, the control unit further generating a control signal;

Step S5: providing a location signal, the control unit transmitting the control signal to a driving unit and further to rotate the driving unit a predetermined angle, an encoding unit generating location information after the driving unit stop rotating, the location information being transmitted to the control unit;

Step S6: calculating and outputting relative angle information, the control unit basing on the initial-state information, the rotation-state information and the location information to calculate angle information, the angle information being then transmitted to an external unit;

Step S7: determining if or not all preset rotations are performed, performing Step S8 if positive, performing Step S3 if negative; and Step S8: analyzing and recording, basing all the angle information to calculate compensation, performing a correction procedure according to the compensation.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
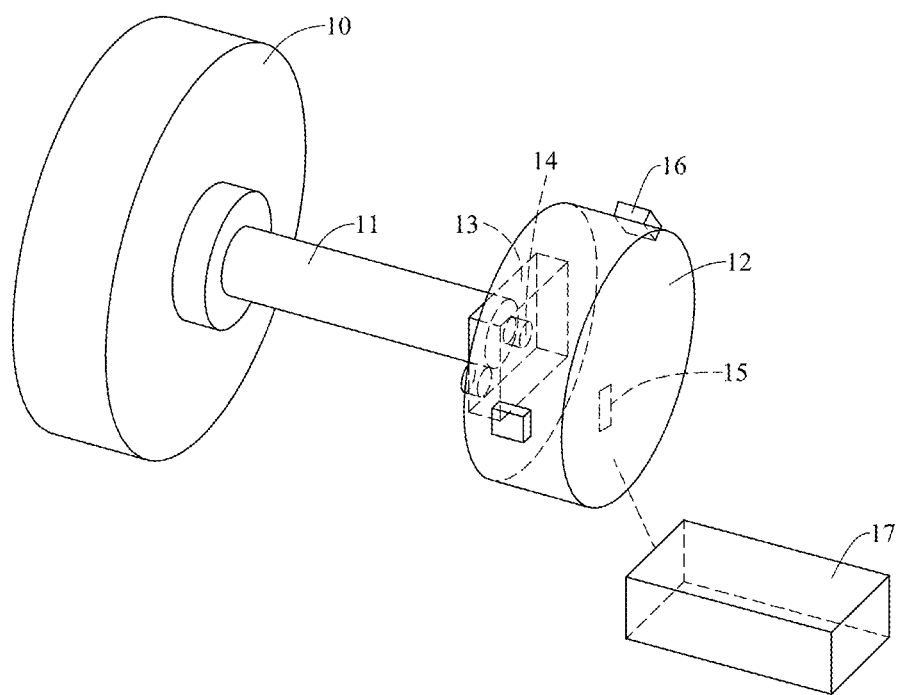
FIG. 1 is a schematic perspective view of a first embodiment of the automatic angle-measured apparatus in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a first embodiment of the automatic angle-measured apparatus in this disclosure includes a clamping plate 10, a connecting shaft 11, a driving seat 12, a driving unit 13, an encoding unit 14, an encoding display unit 15, at least one attitude sensor 16 and a control unit 17.

The clamping plate 10 is to engage an object to be tested. In this embodiment, the object to be tested is a machine station.

The connecting shaft 11 is coupled with the clamping plate 10.

The driving seat 12 is provided to locate the driving unit 13, which is further coupled with the connecting shaft 11. In this embodiment, the driving unit 13 is a motor.

The encoding unit 14 is located at the driving unit 13 at an end thereof facing the driving seat 12. The encoding unit 14 is signally connected to the driving unit 13.

The encoding display unit 15 is located at the driving seat 12 and signally connected to the encoding unit 14.

The attitude sensor 16 is located at the driving seat 12. For example, the attitude sensor 16 can be located at a lateral side of the driving seat 12, especially in the case that the driving seat 12 is shaped as a cylinder.

Figure 2:
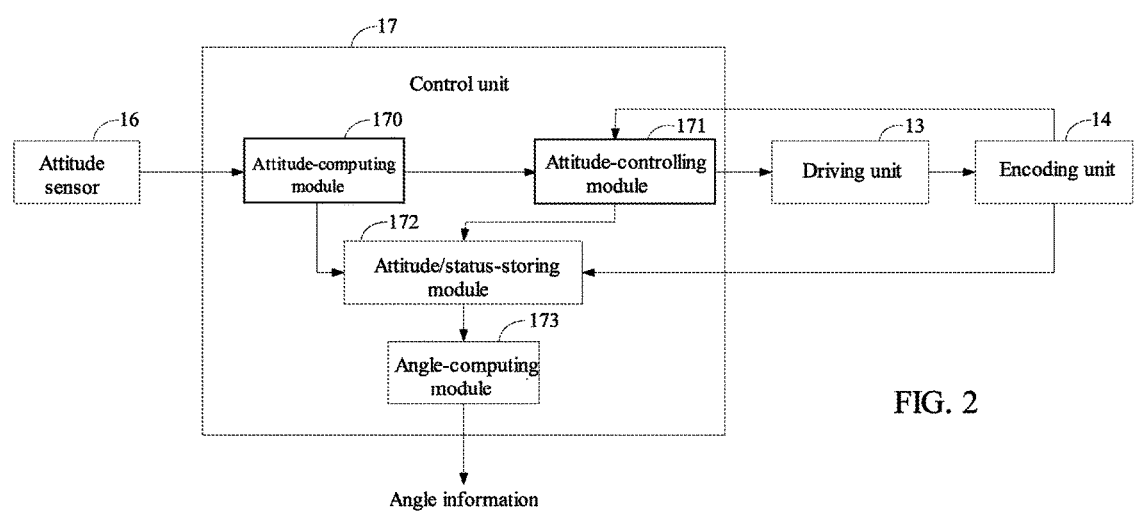
FIG. 2 is a block diagram of a control unit in accordance with this disclosure.

The control unit 17 is signally connected to the encoding unit 14 and the attitude sensor 16. Referring to FIG. 2, the control unit 17 includes an attitude-computing module 170, an attitude-controlling module 171, an attitude/status-storing module 172, and an angle-computing module 173.

The attitude-computing module 170 is signally connected to the attitude sensor 16. The attitude-controlling module 171 is signally connected to the attitude/status-storing module 172, the driving unit 13, the encoding unit 14 and also the attitude-computing module 170. The attitude/status-storing module 172 is signally connected to the encoding unit 14 and the angle-computing module 173.

Figure 3:
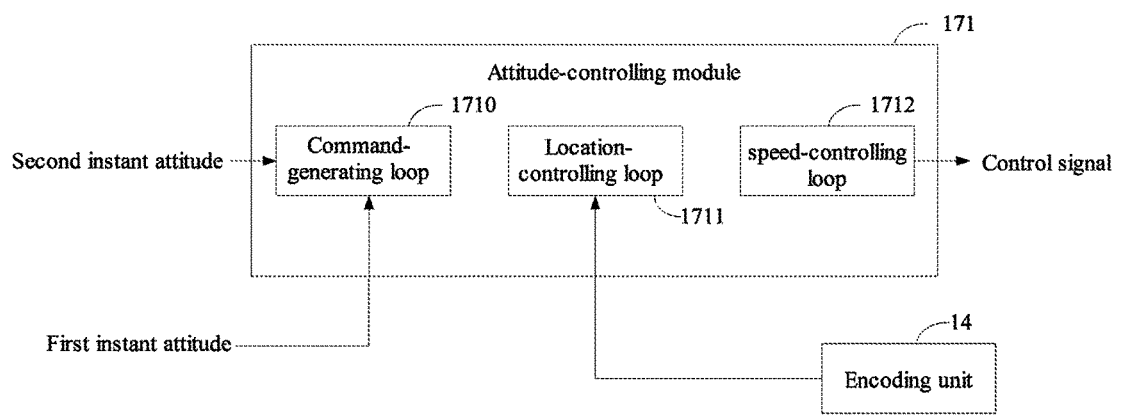
FIG. 3 is a block diagram of an attitude-controlling module in accordance with this disclosure.

Referring now to FIG. 3, the attitude-controlling module 171 further includes a command-generating loop 1710, a location-controlling loop 1711 and a speed-controlling loop 1712. The command-generating loop 1710 is signally connected to the location-controlling loop 1711, and the location-controlling loop 1711 is further signally connected to the speed-controlling loop 1712.

Figure 4:
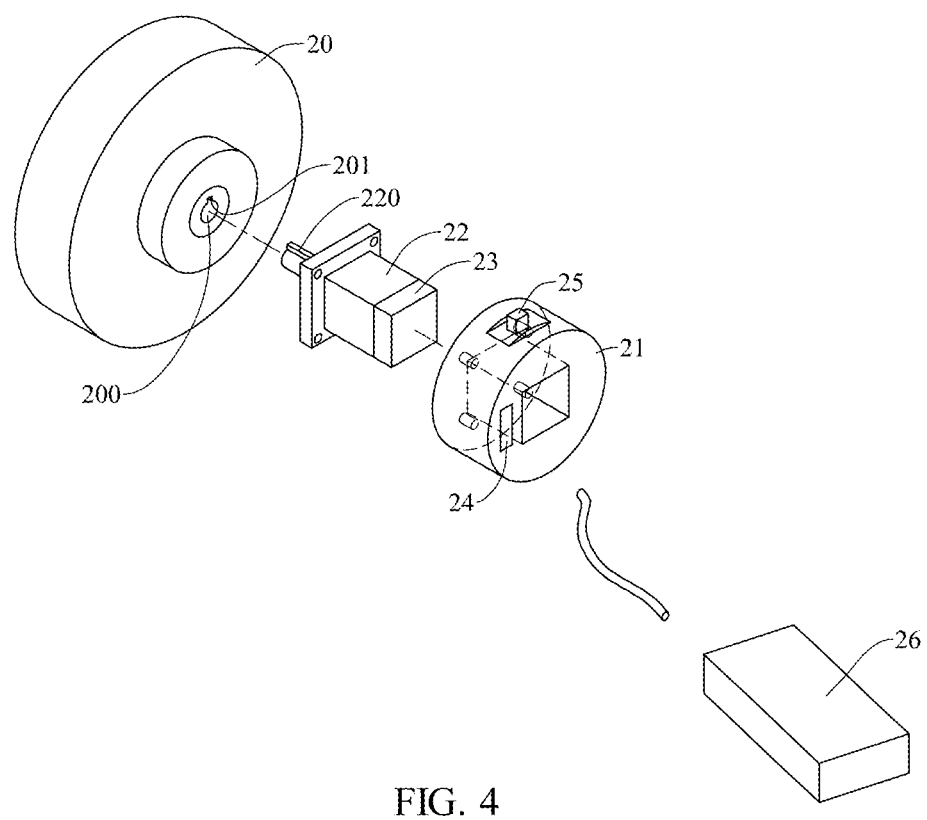
FIG. 4 is a schematic perspective view of a second embodiment of the automatic angle-measured apparatus in accordance with this disclosure.

Referring now to FIG. 4, a second embodiment of the automatic angle-measured apparatus in accordance with this disclosure includes a clamping plate 20, a driving seat 21, a driving unit 22, an encoding unit 23, an encoding display unit 24, at least one attitude sensor 25 and a control unit 26.

In this second embodiment, structuring of the driving seat 21, the driving unit 22, the encoding unit 23, the encoding display unit 24, the attitude sensor 25 and the control unit 26 is resembled to that in the foregoing first embodiment, and thus details thereabout are omitted herein.

The clamping plate 20 is furnished with a receiving hole 200, and further the receiving hole 200 has a key slot 201. One end (the free end) of the driving unit 21 is to protrude into the receiving hole 200. Preferably, the free end of the driving unit 21 is constructed with a key block 210 to engage the key slot 201 of the receiving hole 200 while the driving unit 21 is engaged with the receiving hole 200.

Figure 5:
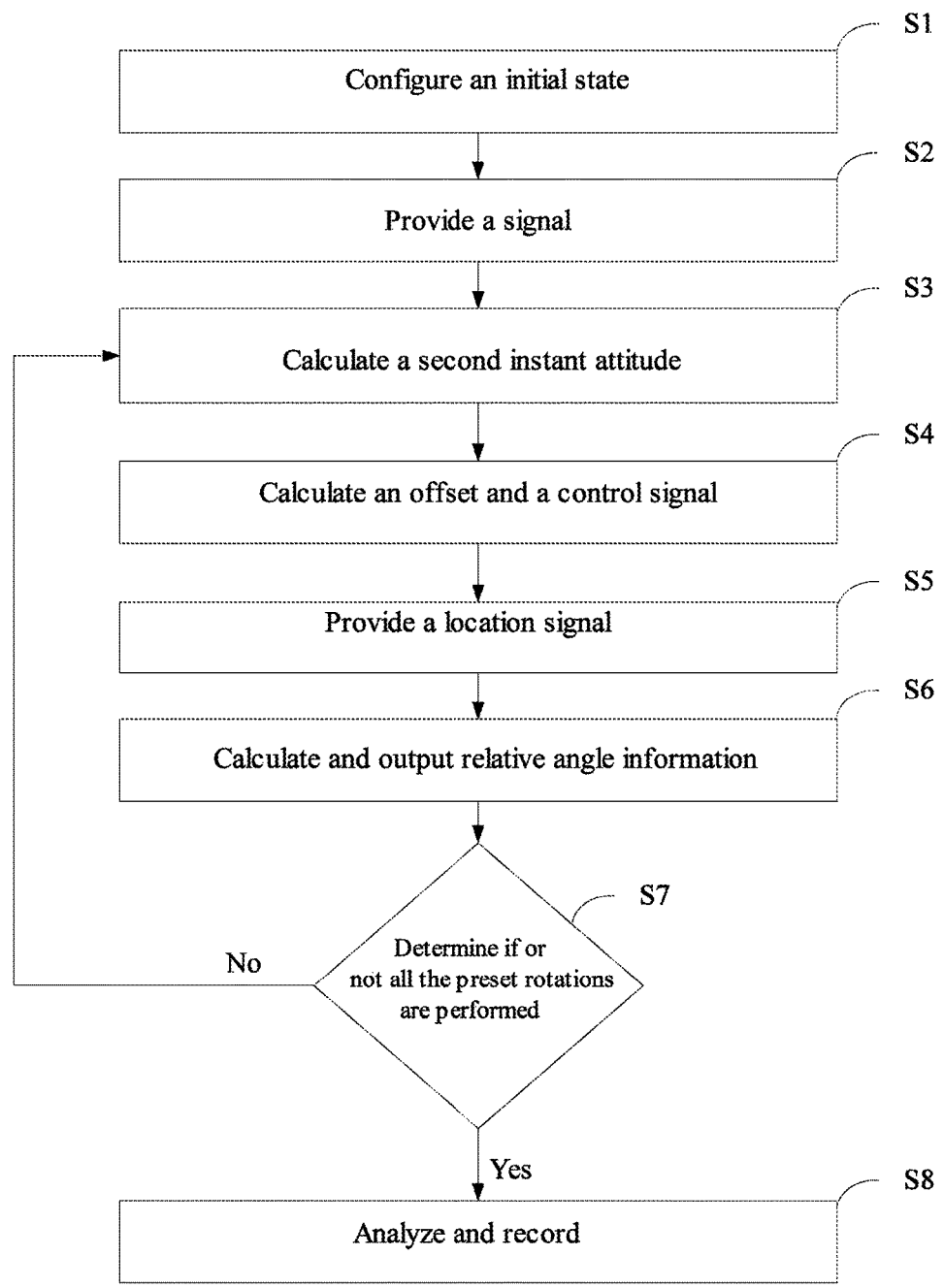
FIG. 5 is a flowchart of the preferred automatic angle-measured method in accordance with this disclosure.

Referring now to FIG. 5, the automatic angle-measured method in accordance with this disclosure includes the following steps.

Step S1: Configure an initial state. Referring to FIG. 1, the clamping plate 10 engages an object to be tested. The driving seat 12 is coupled with the clamping plate 10. The attitude sensor 16 detects an un-rotation state of the driving seat 12 and thereby transmits a first signal to the control unit 17. Based on the first signal, the control unit 17 calculates information of the initial state.

Further, referring to FIG. 2, the first signal from the attitude sensor 16 is then transmitted to the attitude-computing module 170. The attitude-computing module 170 evaluates the first signal to calculate initial-state information. The initial-state information is then stored into the attitude/status-storing module 172. In this disclosure, the initial-state information includes the location information and a first instant attitude of the driving seat 12 in the un-rotation state.

Step S2: Provide a signal. Begin to rotate the object to be tested to a predetermined angle ranged between 1~180 degrees, such as a 15, 30, 45, 60, 75 or 90 degree. While the object to be tested is rotated, the driving seat 12 is rotated with the object to be tested. The attitude sensor 16 detects the state of the driving seat 12 after the rotation and generates a second signal. The second signal is then forwarded to the control unit 17.

Step S3: Calculate a second instant attitude. The attitude-computing module 170 bases on the second signal to calculate rotation-state information. The rotation-state information includes the location information and the second instant attitude of the driving seat 12 after being rotated by the predetermined angle. The rotation-state information is then stored into the attitude/status-storing module 172.

Step S4: Calculate an offset and a control signal. The attitude-computing module 170 bases the initial-state information of Step S1 and the rotation-state information of Step S2 to derive the offset.

Referring to FIG. 3, the command-generating loop 1710 of the attitude-controlling module 171 bases on the first instant state of the initial-state information and the second instant state of the rotation-state information to generate a command. The command is then transmitted to the location-controlling loop 1711 in order to calculate the control signal. The control signal is then transmitted to the speed-controlling loop so as further to add a speed command into the control signal.

Step S5: Provide a location signal. The control unit 17 transmits the control signal to the driving unit 13 so as to rotate the driving unit 13 to the predetermined angle. At the same time, the driving unit 13 bases on the control signal to rotate at a predetermined speed and thereby rotates the driving seat 12 back to the un-rotation location of Step S1, namely back to the initial location.

As the driving unit 13 stops rotation and is completely located, the encoding unit 14 generates location information, which is then transmitted to the control unit 17. The encoding display unit 15 for displaying the location information can perform multiple displaying of the location information. For example, the encoding display unit 15 can display the preceding and the instant location information so as to show the difference in rotation angles.

Step S6: Calculate and output relative angle information. The angle-computing module 173 bases on the initial-state information of Step S1, the rotation-state information of Step S3 and the location information of Step 3 to calculate the angle information. The angle information is then transmitted to an external unit. In this disclosure, the external unit can be a statistics and storage apparatus.

Step S7: Determine if or not all the preset rotations are performed. Namely, judge if a complete rotation procedure preset for the object to be tested is completed. For example, the complete rotation procedure for the object to be tested might be preset to be 360 degrees, but divided into a number of predetermined angular increments (angles). Namely, the 360-degree rotation is divided into a plurality of predetermined rotation sections (in term of the predetermined angles). If all the predetermined rotation sections are performed (i.e. a total 360-degree rotation is performed), then go further to perform Step S8. Otherwise, go back to Step S3 for performing another rotation increment.

Step S8: Analyze and record. Based on all the angle information, compensation can be derived. The object to be tested can then base on the compensation to undergo a correction procedure. The compensation is further stored in the external unit.

By providing the automatic angle-measured apparatus and the method using the same, the object to be tested can be firstly fixed by clamping or jigging, and the attitude sensor is then introduced to detect and locate the instant attitude of the object to be tested. Further, while the object to be tested is rotated, the attitude sensor would sense the attitude change and have the control unit to control the driving unit to move the attitude sensor back to the original attitude. During this procedure, the encoding unit would output the location information accordingly. By providing continuous location information, the rotation of the object to be tested can be precisely monitored and thus relevantly compensated.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. An automatic angle-measured apparatus, comprising:
   a clamping plate, engaging an object to be tested;
   a driving seat;
   a driving unit, coupled with the clamping plate and the driving seat;
   an encoding unit, located at an end of the driving unit facing the driving seat, signally connected to the driving unit;
   an attitude sensor, located on the driving seat; and
   a control unit, signally connected to the encoding unit and the attitude sensor;
   wherein the attitude sensor senses the driving seat in an unrotated state to generate a first signal according to the unrotated state, the attitude sensor senses the driving seat after a rotation by a first predetermined angle to generate a second signal, the control unit calculates an offset according to the first signal and the second signal, the control unit controls the driving unit to rotate a second predetermined angle, the encoding unit generates location information according to the second predetermined angle, the control unit calculates angle information and compensation information according to the first signal, the second signal and the location information, and a correction procedure is then performed according to the compensation information; and
   wherein the clamping plate includes a receiving hole having a key slot, an end of the driving unit protrudes into the receiving hole, and the end has a key block for engaging the key slot.

2. The automatic angle-measured apparatus of claim 1, further including an encoding display unit located on the driving seat and signally connected to the encoding unit.

3. The automatic angle-measured apparatus of claim 1, wherein the control unit further comprises:
   an attitude-computing module, receiving the first signal and the second signal from the attitude sensor and calculating initial-state information and rotation-state information;
   an attitude-controlling module, generating a control signal according to the initial-state information and the rotation-state information, and transmitting said control signal to the driving unit;
   an attitude/status-storing module, storing the initial-state information and the rotation-state information; and
   an angle-computing module, calculating angle information according to the initial-state information, the rotation-state information and the location information of the encoding unit.

4. The automatic angle-measured apparatus of claim 1, wherein the driving unit is a motor and the driving seat is shaped as a cylinder.

5. The automatic angle-measured apparatus of claim 1, further including an encoding display unit located on the driving seat and signally connected to the encoding unit.

6. The automatic angle-measured apparatus of claim 1, further comprising a connecting shaft coupled between the clamping plate and the driving unit.

7. An automatic angle-measured method, comprising the steps of:
   (1) configuring an initial state, comprising:
      engaging an object to be tested to a clamping plate coupled to a diving unit coupled to a driving seat;
      detecting a driving seat in an unrotated state with an attitude sensor to generate a first signal according to said unrotated state;
      a control unit receiving the first signal; and
      said control unit calculating initial-state information including a first instant attitude according to said first signal;
   (2) providing a second signal, comprising:
      rotating the driving seat to a first rotated state at a first predetermined angle;
      detecting the driving seat by said attitude sensor at said first rotated state to generate a second signal according to said first rotated state; and
      transmitting the second signal to the control unit;
   (3) calculating rotation-state information including a second instant attitude by the control unit according to the second signal;

(4) calculating an offset and generating a control signal by the control unit according to the initial-state information and the rotation-state information;

(5) providing a location signal, comprising:
    transmitting the control signal by the control unit to a driving unit;
    rotating the driving unit for a second predetermined angle;
    generating location information by an encoding unit after the driving unit stops rotating; and
    transmitting the location information to the control unit;

(6) calculating and outputting relative angle information by the control unit to an external unit according to the initial-state information, the rotation-state information and the location information;

(7) repeating steps (3) to (7) if not all of a set of preset rotations have been performed; and (8) calculating a compensation according to all the angle information and performing a correction procedure according to the compensation.

8. The automatic angle-measured method of claim 7, wherein in Step (1), a clamping plate is included to engage an object to be tested, the driving seat is coupled with the clamping plate, the first signal of the attitude sensor is transmitted to an attitude-computing module of the control unit, and the attitude-computing module calculates the initial-state information according to the first signal.

9. The automatic angle-measured method of claim 8, wherein in Step (7), the object to be tested is preset to complete the rotation procedure of 360 degrees, the 360 degrees are divided into a plurality of the predetermined angles, and the object to be tested completes the rotation procedure by rotating the plurality of the predetermined angles in an increment manner.

10. The automatic angle-measured method of claim 7, wherein the initial-state information is stored in an attitude/status-storing module of the control unit, and the initial-state information includes location information of the driving seat in the unrotated state.

11. The automatic angle-measured method of claim 7, wherein in Step (2), after the object to be tested is rotated to the first predetermined angle, the attitude sensor detects a state of the driving seat and thereby generates the second signal.

12. The automatic angle-measured method of claim 7, wherein in Step (3), the rotation-state information is location information after the driving seat is rotated to the first predetermined angle, and the rotation-state information is stored in an attitude/status-storing module.

13. The automatic angle-measured method of claim 7, wherein in Step (4), a command-generating loop of an attitude-controlling module generates a command according to the first instant state and a second instant state, the command is further transmitted to a location-controlling loop so as to derive a control signal, and the control signal is further transmitted to a speed-controlling loop for further having the control signal to include a speed command.

14. The automatic angle-measured method of claim 7, wherein in Step (5), an encoding display unit displays the location information.

15. The automatic angle-measured method of claim 14, wherein the encoding display unit displays plural location information.

16. The automatic angle-measured method of claim 7, wherein in Step (6), an angle-computing module of the control unit calculates the angle information according to the initial-state information, the rotation-state information and the location information, and the external unit is a statistics and storage apparatus.

17. The automatic angle-measured method of claim 7, wherein the compensation is stored in the external unit.

\* \* \* \* \*